(12) United States Patent
Noh et al.

(10) Patent No.: US 10,313,096 B2
(45) Date of Patent: Jun. 4, 2019

(54) METHOD FOR SELECTING HD MODE OR FD MODE IN WIRELESS COMMUNICATION SYSTEM SUPPORTING FDR SCHEME AND APPARATUS THEREFOR

(71) Applicant: LG ELECTRONICS INC., Seoul (KR)

(72) Inventors: Kwangseok Noh, Seoul (KR); Hyunsoo Ko, Seoul (KR); Kukheon Choi, Seoul (KR); Dongkyu Kim, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 11 days.

(21) Appl. No.: 15/556,705

(22) PCT Filed: Oct. 14, 2015

(86) PCT No.: PCT/KR2015/010820
§ 371 (c)(1),
(2) Date: Sep. 8, 2017

(87) PCT Pub. No.: WO2016/143966
PCT Pub. Date: Sep. 15, 2016

(65) Prior Publication Data
US 2018/0062824 A1 Mar. 1, 2018

Related U.S. Application Data

(60) Provisional application No. 62/130,568, filed on Mar. 9, 2015.

(51) Int. Cl.
*H04L 5/00* (2006.01)
*H04L 5/14* (2006.01)
(Continued)

(52) U.S. Cl.
CPC .............. *H04L 5/16* (2013.01); *H04B 17/18* (2015.01); *H04B 17/336* (2015.01); *H04L 5/143* (2013.01);
(Continued)

(58) Field of Classification Search
CPC ......... H04L 5/16; H04L 5/0023; H04L 5/006; H04L 5/143; H04B 17/18; H04B 17/336; H04W 88/02; H04W 88/08
See application file for complete search history.

(56) References Cited

U.S. PATENT DOCUMENTS

2006/0210001 A1* 9/2006 Li ...................... H04W 52/243
375/346
2012/0224497 A1 9/2012 Lindoff et al.
(Continued)

FOREIGN PATENT DOCUMENTS

EP 2838293 A1 2/2015
WO 2014/036025 A1 3/2014

*Primary Examiner* — Hassan A Phillips
*Assistant Examiner* — Manuel A. Ortiz Diaz
(74) *Attorney, Agent, or Firm* — Dentons US LLP (57) ABSTRACT

A method for selecting, by a base station, HD mode or FD mode in a wireless communication system supporting an FDR scheme may comprise: a step of receiving, from a second terminal which receives interference from a first terminal, a value related to the signal to noise ratio (SNR) of the second terminal and a value related to the signal-to-interference-plus-noise ratio (SINR) of the second terminal; a step of measuring the SNR value and the SINR value of the base station; a step of calculating the channel capacity ratio between the HD mode and the FD mode by using the received value related to the SNR of the second terminal, the received value related to the SINR of the second terminal, the measured SNR value of the base station, and the measured SINR value of the base station; and a step of selecting (Continued)

either mode on the basis of the calculated channel capacity ratio between the HD mode and the FD mode.

16 Claims, 5 Drawing Sheets

(51) Int. Cl.
  *H04L 5/16* (2006.01)
  *H04B 17/18* (2015.01)
  *H04W 88/02* (2009.01)
  *H04W 88/08* (2009.01)
  *H04B 17/336* (2015.01)

(52) U.S. Cl.
  CPC ............ *H04L 5/006* (2013.01); *H04L 5/0023* (2013.01); *H04W 88/02* (2013.01); *H04W 88/08* (2013.01)

(56) References Cited

U.S. PATENT DOCUMENTS

| | | | |
|---|---|---|---|
| 2013/0083704 A1* | 4/2013 | Gaal | H04L 5/001 370/277 |
| 2013/0194984 A1 | 8/2013 | Cheng et al. | |
| 2013/0223294 A1* | 8/2013 | Karjalainen | H04L 5/14 370/277 |
| 2014/0301217 A1* | 10/2014 | Choi | H04W 28/08 370/252 |
| 2015/0071062 A1* | 3/2015 | Cheng | H04B 7/0689 370/230 |
| 2015/0229461 A1* | 8/2015 | DiFazio | H04L 5/14 370/280 |
| 2015/0341157 A1* | 11/2015 | Eltawil | H04L 5/1453 370/278 |
| 2015/0382375 A1* | 12/2015 | Bhushan | H04L 5/0005 370/252 |
| 2016/0029231 A1* | 1/2016 | Kazmi | H04W 72/1226 370/252 |

* cited by examiner

METHOD FOR SELECTING HD MODE OR FD MODE IN WIRELESS COMMUNICATION SYSTEM SUPPORTING FDR SCHEME AND APPARATUS THEREFOR

This application is a 35 USC § 371 National Stage entry of International Application No. PCT/KR2015/010820 filed on Oct. 14, 2015, and claims priority to U.S. Provisional Application No. 62/130,568 filed on Mar. 9, 2015, all of which are hereby incorporated by reference in their entireties as if fully set forth herein.

TECHNICAL FIELD

The present invention relates to wireless communication, and more particularly, to a method for selecting either a half duplex (HD) mode or a full duplex (FD) mode in a wireless communication system supporting an FUR scheme and apparatus therefor.

BACKGROUND ART

A full duplex radio (FDR) or full duplex communication scheme means a communication scheme for enabling a user equipment to simultaneously perform transmission and reception using the same resource. In this case, the same resource means the same time and frequency. FDR communication or full duplex communication can be referred to as two-way communication.

Figure 1:
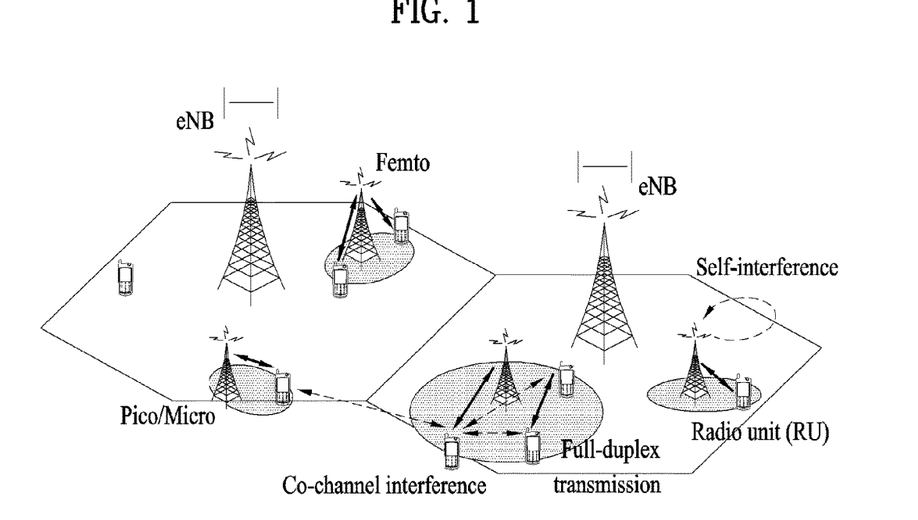
FIG. 1 is a conceptual diagram illustrating a user equipment (UE) and a base station (BS) that support FUR.

FIG. 1 is a conceptual diagram illustrating a user equipment (UE) and a base station (BS) that support FUR.

Referring to FIG. 1, there are three types of interferences in a network that supports the FDR. The first one is intra-device self-interference. The intra-device self-interference means that a signal transmitted from a transmit (Tx) antenna of a BS or UE is received by a receive (Rx) antenna of the BS or UE, thereby acting as interference. Since the signal transmitted from the TX antenna is transmitted with high power and a distance between the TX antenna and the RX antenna is relatively short, the signal is received at the RX antenna with almost no power loss. Thus, receive power of the signal is much higher than that of a desired signal. The second one is UE-to-UE inter-link interference. When a network supports the FDR, the UE-to-UE inter-link interference is increased. Specifically, if an uplink signal transmitted by a UE is received by an adjacently located UE, the uplink signal may act as interference to the adjacently located UE. This type of interference is referred to as the UE-to-UE inter-link interference. The third one is BS-to-BS inter-link interference. Similar to the UE-to-UE inter-link interference, the BS-to-BS inter-link interference is also increased when a network supports the FDR. If signals transmitted between BSs or heterogeneous BSs (e.g., pico, femto, relay, etc.) in a HetNet situation are received by an RX antenna of another BS, the signals may act as interference to another BS. This type of interference is referred to as the BS-to-BS inter-link interference.

Among the three types of interference, the intra-device self-interference (hereinafter referred to as self-interference) occurs only in the FDR. Thus, problems caused by the self-interference should be solved to efficiently manage the FDR system.

DISCLOSURE OF THE INVENTION

Technical Task

One object of the present invention is to provide a method performed by a base station for selecting either a half duplex (HD) mode or a full duplex (FD) mode in a wireless communication system supporting a full duplex radio (FDR) scheme.

Another object of the present invention is to provide a base station for selecting either an HD or FD mode in a wireless communication system supporting an FDR scheme.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided herein is a method for selecting either a half duplex (HD) mode or a full duplex (1-D) mode by a base station (BS) in a wireless communication system supporting a full duplex radio (FDR) scheme, including: receiving, from a second user equipment (UE) which suffers interference from a first UE, a value related to a signal-to-noise ratio (SNR) of the second UE and a value related to a signal-to-interference-plus-noise ratio (SINR) of the second UE; measuring SNR and SINR values of the BS; calculating a channel capacity ratio between the HD and FD modes using the value related to SNR of the second UE, the value related to SINR of the second UE, the measured SNR value of the BS, and the measured SINR value of the BS; and selecting either the HD or FD mode based on the calculated channel capacity ratio. The method may further include transmitting information on the selected mode to the first UE and second UE. The value related to SNR of the second UE may include receive power and a thermal noise value of the second UE for a specific signal in a corresponding channel bandwidth. The value related to SINR of the second UE may include receive power and a thermal noise value of the second UE for a specific signal in a corresponding channel bandwidth and inter-UE interference power caused by the first UE.

In another aspect of the present invention, provided herein is a base station (BS) for selecting either a half duplex (HD) mode or a full duplex (FD) mode in a wireless communication system supporting a full duplex radio (FDR) scheme, including: a receiver configured to receive, from a second user equipment (UE) which suffers interference from a first UE, a value related to a signal-to-noise ratio (SNR) of the second UE and a value related to a signal-to-interference-plus-noise ratio (SINR) of the second UE; and a processor. In this case, the processor may be configured to: measure SNR and SINR values of the BS; calculate a channel capacity ratio between the HD and FD modes using the value related to SNR of the second UE, the value related to SINR of the second UE, the measured SNR value of the BS, and the measured SINR value of the BS; and select either the HD or FD mode based on the calculated channel capacity ratio between the HD and FD modes. The BS may further include a transmitter configured to transmit information on the selected mode to the first and second UEs. The value related to SNR of the second UE may include receive power and a thermal noise value of the second UE for a specific signal in a corresponding channel bandwidth. The value related to SINR of the second UE may include receive power and a thermal noise value of the second UE for a specific signal in a corresponding channel bandwidth and inter-UE interference power caused by the first UE.

In a further aspect of the present invention, provided herein is a first user equipment (UE) for selecting either a half duplex (HD) mode or a full duplex (FD) mode in a wireless communication system supporting a full duplex radio (FDR) scheme, which suffers interference from a neighboring UE, including: a processor configured to: calculate a signal-to-noise ratio (SNR) value of the first UE and a signal-to-interference-plus-noise ratio (SINR) value of the first UE; and select either the HD or FD mode based on the calculated SNR value of the first UE and the SINR value of the first UE. The processor may be configured to compare a value of $(1+SINR_{victim})^2/(1+SNR_{victim})$ with a specific threshold value; if the value is lower than the specific threshold value, select the HD mode; and otherwise, select the FD mode. Here, $SINR_{victim}$ may be the SINR of the first UE and $SNR_{victim}$ may be the SNR of the first UE. The first UE may further include a transmitter configure to transmit information indicating the selected mode to a base station (BS).

Advantageous Effects

According to the present invention, it is possible to improve overall performance of a wireless communication system supporting FDR by selecting either an HD or FD mode and performing switching operation therebetween in an efficient manner according to proposed methods.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
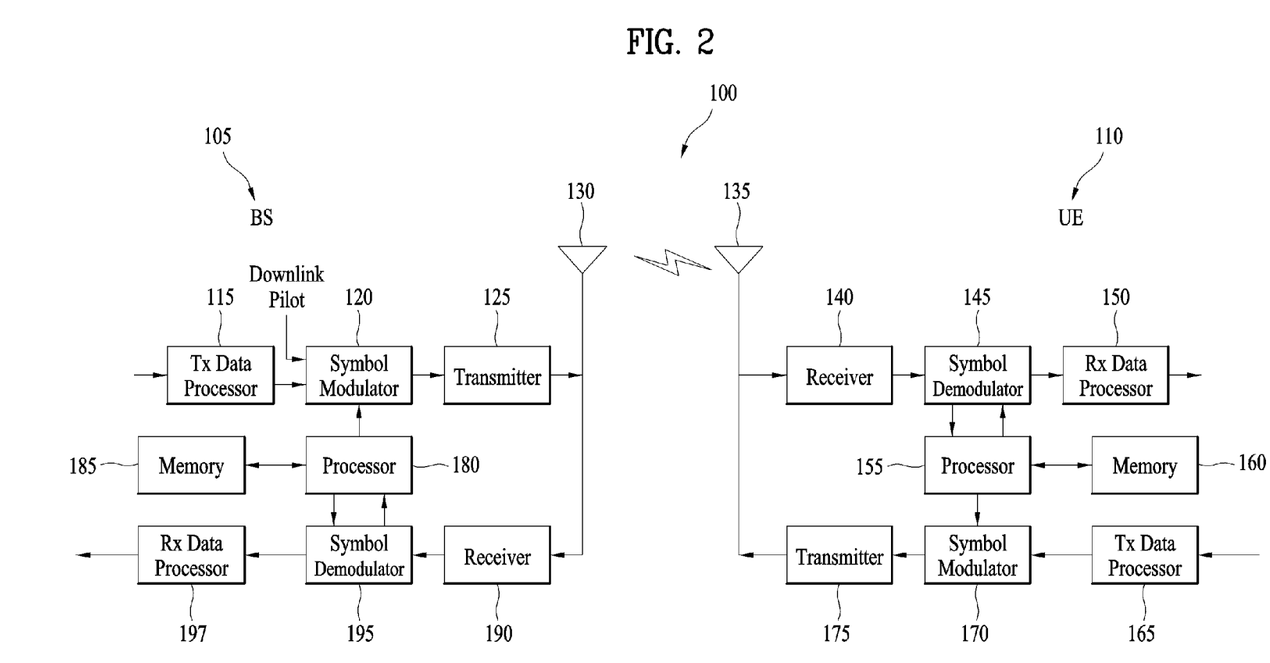
FIG. 2 is a block diagram illustrating configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
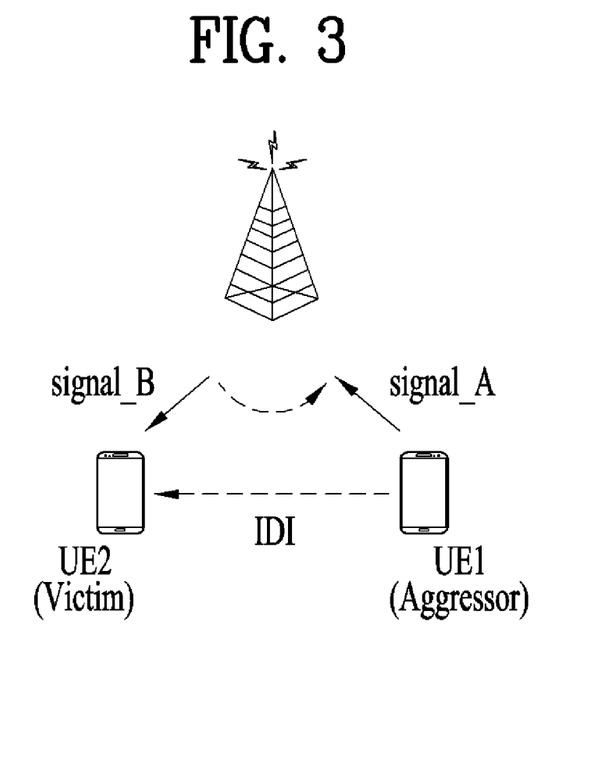
FIG. 3 is a diagram for explaining the concept of inter-UE interference (or inter-device interference (IDI)).

FIG. 3 is a diagram for explaining the concept of inter-UE interference (or inter-device interference (IDI)).

The IDI occurs only in the FDR system because the same resource is used within a cell. Specifically, FIG. 3 shows the concepts of the IDI, which occurs when a BS uses an FD mode (i.e., a mode for simultaneously performing transmission and reception using the same frequency) on the same resource. In the legacy full-duplex communication system, since frequency division duplex (FDD) or time division duplex (TDD) is used, i.e., resources used for transmission are different from those used for reception, the IDI does not occur. In addition, interference between neighboring cells in the legacy system still causes a problem to the FDR system. In other words, there is not only full duplex on the same resource but also full duplex on different resources in the FDR system.

As a method for efficiently using limited frequency resources in a two-way communication situation, FD communication has been proposed. However, in the FD communication, since time and frequency resources are shared for two-way communication, the amount of interference may be increased. Thus, if the performance is severely degraded due to the interference, a method of limiting the number of HD/FD communication UEs that simultaneously use the same frequency band needs to be considered to adjust interference between the HD/FD communication UEs and to overcome the performance degradation.

To this end, the number of simultaneous access users should be determined so as to maximize network throughput or to satisfy throughput required by each UE as well as to maximize the network throughput. In this case, each UE may perform a process of switching to either the FD or HD mode (i.e., mode selection) by considering IDI, i.e., inter-UE interference.

The general concept where UEs under the influence of IDI measure the amount of interference and then report information on the amount of interference to a BS, and the BS performs mode selection has been described. However, a particular method for implementing the concept has not been proposed yet. In addition, two bits are allocated for the purpose of distinguishing whether a UE is an FDR device (including a self-interference canceller) that can operate in the FD mode on the same resource and whether a UE is an FDR device that cannot operate in the FD mode on the same resource but supports the FD mode on the same resource. In this case, the two bits of information is reported to a BS. Based on the information, the BS can determine the FD/HD mode of all the UEs in the network by distinguishing whether each of the UEs is either the FDR device operating in the FD mode or the FDR device supporting the FD mode (e.g., UEs in FIG. 3).

The present invention proposes a particular method for configuring FD/HD mode. More particularly, the invention proposes not only a reporting method, which is not limited to reporting of information on the amount of interference, but also a method of configuring an FD or HD mode of a UE to maximize network throughput.

When the FD mode is applied to the BS, it is possible to overcome loss due to resource partitioning (FDD or HDD) of the HD mode and achieve higher system performance. However, unlike the conventional system, the self-interference (SI) and inter-device interference (IDI) may occur due to devices that perform simultaneous transmission and reception using the same resource as shown in FIG. 3. Due to this interference, the system performance of the FDR system may become lower than that of the system using the HD mode. In addition, even though SI cancellation (SIC) and IDI cancellation (IDIC) is performed to cancel the SI and IDI, the system performance of the FDR system may be lower than that of the system using the HD mode due to residual SI and residual IDI which is not removed after the SIC and IDIC.

The HD/FD mode selection can be performed by comparison of a channel capacity (CFD) of the FDR system and a channel capacity (CHD) of the HD system in a situation that transmission is performed at the same time. In the case of the HD mode, although the IDI does not occur, there may be a pre-log term because time or frequency resources are divided in half.

The channel capacity of the FDR system and the channel capacity of the HD system can be calculated according to Equations 1 and 2, respectively.

Equation 1

$$C_{FD} = BW\{\log(1+SINR_{eNB}) + \log(1+SINR_{victim})\}$$
$$= BW\left\{\log\left(1+\frac{P_A}{P_{SI}+N_{eNB}}\right) + \log\left(1+\frac{P_B}{P_{IDI}+N_{victim}}\right)\right\}$$
[Equation 1]

Equation 2

$$C_{HD} = \frac{1}{2}BW\{\log(1+SINR_{eNB}) + \log(1+SINR_{victim})\}$$
$$= \frac{1}{2}BW\left\{\log\left(1+\frac{P_A}{N_{eNB}}\right) + \log\left(1+\frac{P_B}{N_{victim}}\right)\right\}$$
[Equation 2]

In Equations 1 and 2, a BW indicates a channel bandwidth, $P_A$ indicates receive power of a BS that is supposed to receive signal A, and $P_B$ indicates receive power of a victim UE that is supposed to receive signal B. Here, a victim UE means a UE that receives an interference signal from a neighboring UE and an aggressor UE means a UE that causes interference to a neighboring UE by performing uplink transmission. $P_A$ and $P_B$ represent power obtained by reflecting transmission loss in transmit power of an aggressor UE and BS, which operate as a transmitting end. In addition, $P_{SI}$ indicates power of an SI signal at the BS and $P_{IDI}$ indicates IDI power of the victim UE. Specifically, when the interference cancellation (SIC or IDIC) is performed, $P_{SI}$ indicates power of a residual SI signal and $P_{IDI}$ indicates power of residual IDI at the victim UE. Moreover, N indicates thermal noise at the receiving end, $N_{victim}$ indicates thermal noise at the victim UE, and $N_{eNB}$ indicates thermal noise at the BS.

To maximize the network throughput, it is possible to select a mode having a larger channel capacity through comparison results of Equations 1 and 2. The FD/HD mode configuration according to transmit power is shown in the following example. That is, Equation 3 can be deduced from Equations 1 and 2. In Equation 3, if the left side is greater than the right side, it indicates that the HD mode has a larger channel capacity. On the contrary, if the right side is greater than the left side, it indicates that the FD mode has a larger channel capacity.

Equation 3

$$\frac{1}{2}\left\{\log\left(1+\frac{P_{H,A}}{N_{eNB}}\right) + \log\left(1+\frac{P_{H,B}}{N_{victim}}\right)\right\} < \text{or} >$$
$$\log\left(1+\frac{P_{F,A}}{P_{SI}+N_{eNB}}\right) + \log\left(1+\frac{P_{F,B}}{P_{IDI}+N_{victim}}\right)$$
[Equation 3]

In Equation 3, $P_{x,y}$ indicates transmit power of signal y in mode x and thus, $P_{H,A}$ indicates transmit power of the signal A in the HD mode.

Meanwhile, if $P_A$ is considered as transmit power of the aggressor (or aggressor UE) and PB is considered as transmit power of the BS in Equations 1 to 3, Equation 3 can be expressed as Equation 4. For simplicity of notation, a sign of inequality is used on the assumption that the channel capacity of the FD mode is larger than that of the HD mode.

Equation 4

$$\frac{1}{2}\left\{\log\left(1 + \frac{\alpha P_{H,A}}{N_{eNB}}\right) + \log\left(1 + \frac{\beta P_{H,B}}{N_{victim}}\right)\right\} < \qquad \text{[Equation 4]}$$
$$\log\left(1 + \frac{\alpha P_{F,A}}{\beta' P_{F,B} + N_{eNB}}\right) + \log\left(1 + \frac{\beta P_{F,B}}{\alpha' P_{F,A} + N_{victim}}\right)$$

In Equation 4, α indicates a residual power ratio of the transmit power $P_A$ in which power path loss to the BS is considered to the transmit power of the aggressor UE, $P_A$ and α' indicates a residual power ratio of the transmit power $P_A$ in which power path loss to the victim UE is considered to the transmit power of the aggressor UE, $P_A$. In addition, β indicates a residual power ratio of the transmit power $P_B$ in which power path loss to the victim UE corresponding to the receiving end is considered to the transmit power of the BS, $P_B$ and β' indicates a residual power ratio of the transmit power $P_B$ in which power loss of a signal received by the BS as self-interference is considered to the transmit power of the BS, $P_B$.

In Equation 4, when the SIC is not performed, β is greater than β'. On the contrary, when the SIC is perfectly performed, β is greater than β' and β' becomes zero.

For example, considering free-space loss and path loss (PL) in the Friis transmission equation, α and β can be expressed as shown in Equation 5.

Equation 5

$$PL = 20\log\left(\frac{4\pi d}{\lambda}\right)(dBm) \qquad \text{[Equation 5]}$$

In Equation 10, λ indicates a wavelength (m) and d indicates a distance (m) between transmitting and receiving UEs. In addition, relationships shown in Equation 6 can be established.

Equation 6

$$\alpha = \frac{P_A - PL}{P_A}, \beta = \frac{P_B - PL}{P_B} \qquad \text{[Equation 6]}$$

In addition, β' which is generated by reception of the self-interference can be considered as when the SIC is not performed, there is almost no path loss and thus, it can be close to 1. Moreover, when the IDIC and SIC is performed, α' and β' can include not only path loss but also interference cancellation capability. For example, assuming that the transmit power of the BS is 30 dBm, the transmit power of the aggressor UE is 23 dBm, all the path loss is 30 dBm, the IDIC is 40 dBm, and the SIC is 30 dBm, α, β, and α' are −30 dB before the SIC and IDIC is performed, that is, each of them indicates $10^{-3}$. After the SIC and IDIC is performed, α and β become equal to each other. In addition, since α' is −70 dB and β is −30 dB, they indicate $10^{-7}$ and $10^{-3}$, respectively. Since each of the residual power ratios means a reduced ratio of the transmit power, the amount of reduction can be expressed in a unit of dB.

SIC Schemes and Application Therefor

Figure 4:
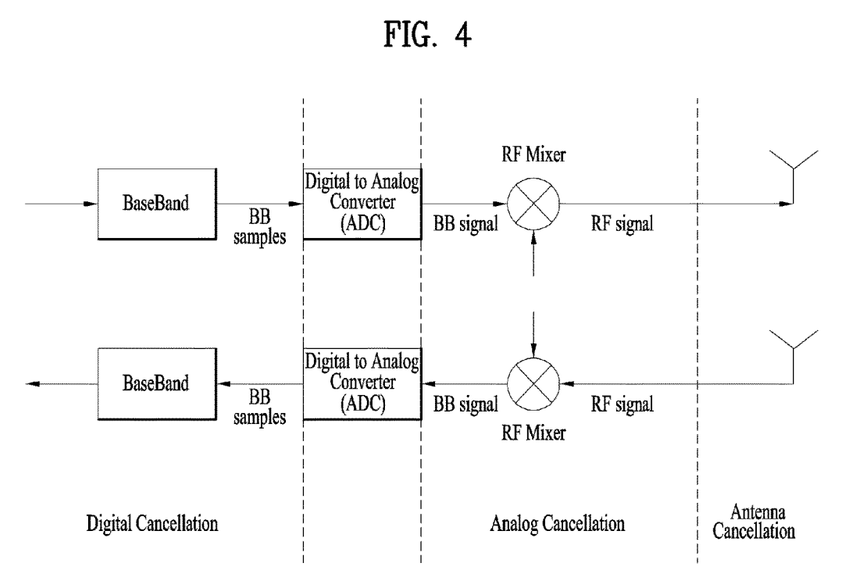
FIG. 4 is a diagram illustrating positions where three interference cancellation schemes are applied in an RF transceiver (or RF front end) of a device.

FIG. 4 is a diagram illustrating positions where three interference cancellation schemes are applied in an RF transceiver (or RF front end) of a device. Hereinafter, a description will be given of the three SIC schemes in brief.

Antenna SIC: Among all the SIC schemes, the antenna SIC should be preferentially performed. SI is cancelled at an antenna end. Most simply, transmission of an SI signal may be blocked physically by placing a signal-blocking object between a Tx antenna and an Rx antenna, a distance between antennas may be controlled artificially using multiple antennas, or a part of an SI signal may be canceled through phase inversion of a specific transmitted signal. Further, a part of an SI signal may be cancelled by means of multiple polarized antennas or directional antennas.

Analog SIC: Interference is canceled at an analog end before a received signal passes through an Analog-to-Digital Convertor (ADC). An SI signal is canceled using a duplicated analog signal. This may be performed in an RF region or an Intermediate Frequency (IF) region. SI signal cancellation may be performed in the following specific manner. A duplicate of an actually received SI signal is generated by delaying a transmitted analog signal and controlling the amplitude and phase of the delayed analog signal, and then it is subtracted from a signal received at an Rx antenna. However, due to the analog signal-based processing, implementation complexity and circuit characteristics may cause additional distortion and thus, interference cancellation performance may be significantly degraded.

Digital SIC: Interference is canceled after a received signal passes through an ADC. The digital SIC covers all IC techniques performed in a baseband region. Most simply, a duplicate of an SI signal is generated using a transmitted digital signal and then it is subtracted from a received digital signal. Alternatively, techniques for preventing a signal transmitted from a UE or BS from being received at an RX antenna by performing precoding/postcoding in a baseband using multiple antennas may be considered as the digital SIC. However, considering that the digital SIC is feasible only when a digital signal is quantized to a level enough to recover information of a desired signal, a power difference between the designed signal and the interference signal remaining after interference cancellation based on at least one of the aforementioned schemes should be within an ADC range.

In general, the SIC is performed in three steps, and more particularly, antenna, analog, and digital SIC is sequentially applied. The antenna/analog SIC is performed before an ADC and the digital SIC is performed to cancel SI of a signal that passes through the ADC.

In this case, if the antenna/analog SIC is not correctly performed, signal distortion may occur due to saturation during the ADC and the digital SIC may not also be performed correctly. Thus, the SI should be decreased such that the signal has a size enough to pass through the ADC.

Figure 5:
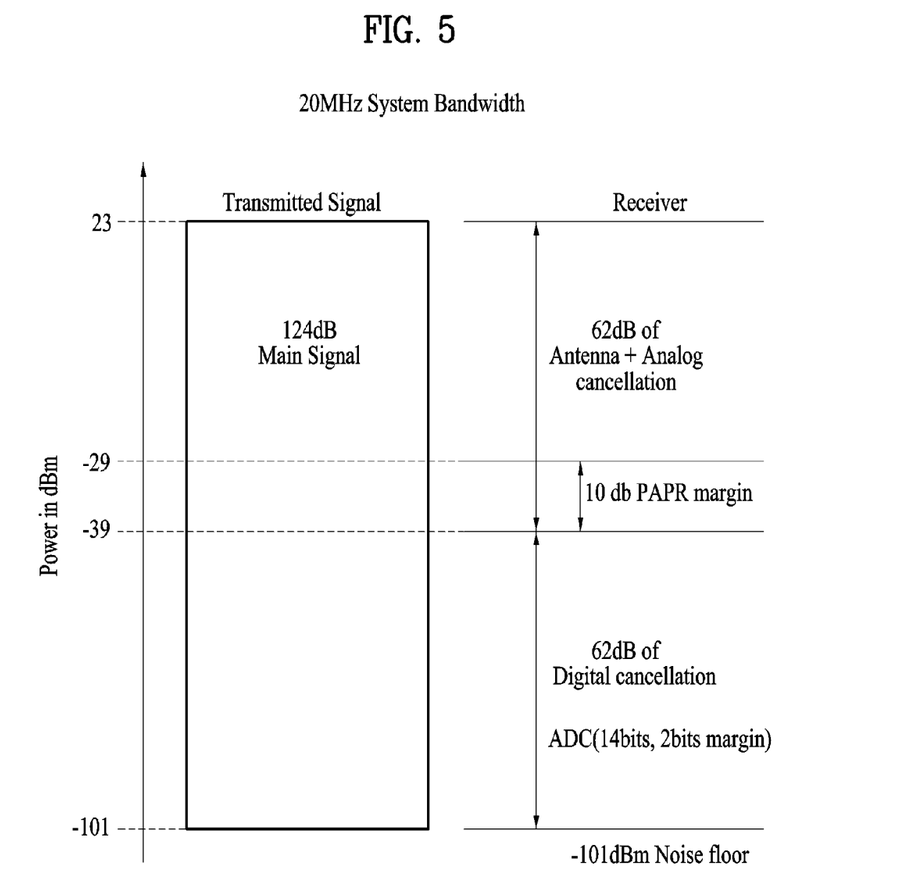
FIG. 5 is a diagram illustrating performance of three self-interference cancellation (SIC) schemes.

FIG. 5 is a diagram illustrating performance of three self-interference cancellation (SIC) schemes.

A signal size capable of passing through an ADC is changed depending on ADC resolution bits. For example, in case of 12 bits of ADC, a signal that is equal to or lower by about 62 dB than a noise floor can be passed. FIG. 5 illustrates step-by-step cancellation performance of SIC (minimum antenna and analog cancellation performance and maximum digital cancellation performance) when transmit power is 23 dBm and a noise floor is −96 dBm.

If a factor for indicating whether a signal passes through an ADC is considered together with the FD channel capacity in Equation 3, a channel capacity can be calculated as shown in Equation 7.

Equation 7

$$\log\left(1 + \frac{\alpha P_{F,A}}{\min(\beta''\beta' P_{F,B}, f(SIC_{ADC})) + N_{eNB}}\right) + \log\left(1 + \frac{\beta P_{F,B}}{\alpha' P_{F,A} + N_{victim}}\right) \quad \text{[Equation 7]}$$

In Equation 7, β' indicates a residual power ratio of transmit power obtained by performing antenna/analog SIC on a signal received as SI and β" indicates a residual power ratio obtained by performing digital SIC on an SI signal that passes through an ADC. For example, assuming that the magnitude of an SI reception signal is 23 dBm, 60 dB of interference can be cancelled through antenna/analog SIC, and 50 dB of interference can be cancelled through digital SIC, β' and β" of Equation 7 respectively become −60 dB and −50 dB, and β' of Equation 3 becomes −110 dB.

Meanwhile, f(SIC$_{ADC}$) is a function of indicating whether an SI signal passes through an ADC. If the SI signal fails to pass through the ADC, it has an extremely large value compared to those of a noise and desired signal (e.g., signal A) and a digital cancellation function cannot be performed as well. That is, it could be interpreted as that a corresponding UE cannot receive any signals. Since the magnitude of a residual SI signal is determined based on the digital SIC after passing through the ADC, the f(SIC$_{ADC}$) can be expressed as Equation 8.

Equation 8

$$f(SIC_{ADC}) = \beta' P_{F,B} \text{ or } -\infty \quad \text{[Equation 8]}$$

In Equation 8, −∞ indicates a value of the f(SIC$_{ADC}$) when a signal fails to pass through the ADC. Whether a signal passes through the ADC can be determined with reference to a threshold where the ADC resolution bits are considered, as shown in Equation 9.

Equation 9

$$\frac{\beta' P_{F,B}}{N_{eNB}} > \text{Threshold} \quad \text{[Equation 9]}$$

Equation 9 shows a case in which a signal fails to pass through the ADC. The opposite sign of inequality indicates a case in which a signal passes through the ADC.

Since noise power of a signal-to-noise ratio (SNR) and a signal-to-interference-plus-noise ratio (SINR) can be obtained using Equation 10, it is possible to calculate a capacity using the SNR and SINR.

Equation 10

$$N_{0,BW} = -174 \text{ dBm} + 10 \times \log_{10}(BW) + \text{ReceiverNoiseFigure} \quad \text{[Equation 10]}$$

since the mode selection can be performed by comparison of capacities in the HD and FD modes, Equations 1, 2, 3, 4, and 7 can be used for comparison as shown in Equation 11.

Equation 11

$$0 \le \frac{FD \text{ capacity}}{HD \text{ capacity}} = \quad \text{[Equation 11]}$$

$$\frac{\log\{(1 + SINR_{eNB})^2(1 + SINR_{victim})^2\}}{\log\{(1 + SNR_{eNB})(1 + SNR_{victim})\}} \le 2$$

In general, the BS and UE are considered as subjects that perform the mode selection between the HD and FD modes. In Equation 11, the upper bound of 2 represents that the FD channel capacity is equal to or lower than double of the HD channel capacity.

(1) A Case in which a BS Performs Mode Selection

The BS can obtain information necessary for configuring Equation 11 from UEs' reports. Specifically, SINR$_{eNB}$ and SNR$_{eNB}$ can be obtained from values measured by the BS and SINR$_{victim}$ and SNR$_{victim}$ can be received by a victim UE. In this case, the victim UE may transmit values of the components necessary for configuring the SINR$_{victim}$ and SNR$_{victim}$ in Equations 1, 2, 3, and 4 instead of transmitting the SINR$_{victim}$ and SNR$_{victim}$. Alternatively, the victim UE may transmit only offset values for comparison with the previously reported values. That is, the BS may perform calculation as shown in Equation 11 on the basis of the measured SNR and SINR, and the SINR$_{victim}$ and SNR$_{victim}$ received from the victim UE (or the values of the components necessary for configuring the SINR$_{victim}$ and SNR$_{victim}$ in Equations 1, 2, 3, and 4) and then determine which one of the HD channel capacity and FD channel capacity is large. When the HD channel capacity is larger than the FD channel capacity, the BS may select the HD mode. On the contrary, when the FD channel capacity is larger than the HD channel capacity, the BS may select the FD mode. Thereafter, the BS may dynamically transmit information indicating the selected mode to the victim and aggressor UEs through a physical downlink control channel (PDCCH), a physical downlink shared channel (PDSCH) or higher layer signaling (e.g., radio resource control (RRC) signal).

(2) A Case in which a UE Performs Mode Selection

Considering that the log function is a monotone increasing function, when a value of $(1+SINR_{victim})^2/(1+SNR_{victim})$ is smaller than a specific threshold (e.g., threshold=1), it may indicate that the HD mode is more beneficial. Thus, a UE may determine a preferred mode by comparing the value of $(1+SINR_{victim})^2/(1+SNR_{victim})$ with the specific threshold value and then inform a BS of the determined mode as 1 bit of information through an uplink control information (UCI) format in a physical uplink control channel (PUCCH) or physical uplink shared channel (PUSCH). For example, when the value of $(1+SINR_{victim})^2/(1+SNR_{victim})$ is smaller than 1, the UE may select the HD mode operation. On the contrary, when the value of $(1+SINR_{victim})^2/(1+SNR_{victim})$ is equal to or greater than 1, the UE may select the FD mode operation. In the both cases, the UE may inform the BS of its operation mode using 1-bit information. Specifically, when the UE selects the HD mode, the UE may set the 1-bit information to '0'. When the UE selects the FD mode, the UE may set the 1-bit information to '1' (it is a matter of course that the 1-bit information set to '0' indicates the FD mode and the 1-bit information set to '1' indicates the HD mode).

Alternatively, the UE can report information on the selected mode only when the mode is changed based on the previously reported value. The threshold used by the UE to determine the preferred mode may be changed according to a UE's remain power profile, a buffer state, a cost for SIC, and the like.

Mode Selection in Consideration of Outage Probability

To determine the channel capacity, a ratio of power of a transmitted signal to noise power or noise power+interference power is considered. Although the capacity generally has an error, it is premised that if a length of the transmitted signal is long, there is almost no error. However, considering instantaneously changed factors and limitation in the length of the transmitted signal, there must be an error. Thus, in the FD and HD modes, an outage capacity can be added for the same BER target.

An outage capacity $C_e$ indicates a maximum channel capacity when an outage probability is equal to or smaller than $e(=P_{out}(R))$. Here, the outage probability indicates a decreased probability so that the strength of the received signal cannot maintain a data rate R.

Equation 12

$$C_e = \log_2(1 + F^{-1}(1-e))  \quad [\text{Equation 12}]$$

In Equation 12, F(x) is a complementary cumulative distribution function (CDF) (1−CDF). That is, F(x)=P{SINR>x}. The outage probability can be expressed as shown in Equation 13.

Equation 13

$$P_{out}(R) = P\{\log_2(1+\text{SINR}) < R\}  \quad [\text{Equation 13}]$$

To use the outage probability in the HD mode, a performance graph of SNR vs bit error ratio (BER) (or block error ratio (BLER)) is required. In addition, in the FD mode, a performance graph of SINR vs BER (or PER) is required. Alternatively, a graph of SNR (SINR) vs outage probability in the HD (FD) mode is required. In this case, by distinguishing between the SIC and IDIC, a performance graph in accordance with the SINR can be referred separately. For example, referring to such a performance graph for the SINR, when SIC performance (or IDIC performance) shows a specific value, BER (or BLER) performance can be estimated from a residual interference signal.

When the outage capacity is used as described above, it can be easily seen that a selectable mode is changed according to a target BER. For example, since as the target BER is increased, the effect of residual IDI/SI after IDIC and SIC is decreased compared to that when the target BER is low, the probability of selecting the FD mode rather than the HD mode may be increased. That is, if the target BER is $10^{-5}$, the HD mode needs to be selected due to IDIC and SIC performance. If the target BER is $10^{-2}$, the FD mode can be selected to improve the network throughput because a certain magnitude of residual interference signal can be allowed.

Similar to the case in which the mode is selected by the UE, the UE can transmit the mode selection result as 1-bit information using $(1+F^{-1}(1-e_{FD}))/(1+F^{-1}(1-e_{HD}))$. That is, the UE can perform the mode selection by comparing a value of $(1+F^{-1}(1-e_{FD}))/(1+F^{-1}(1-e_{HD}))$ with a specific threshold. Here, $e_{FD}$ and $e_{HD}$ indicate outage probabilities according to the target BER in the FD and HD modes, respectively and they can be calculated using the BER or BLER performance graph.

Similar to the case in which the mode is selected by the BS, the BS can obtain $\text{SINR}_{eNB}$ and $\text{SNR}_{eNB}$ from values measured by itself and receive $\text{SINR}_{victim}$ and $\text{SNR}_{victim}$ from the victim UE. In this case, the victim UE may transmit, to the BS, the values of the components necessary for configuring the $\text{SINR}_{victim}$ and $\text{SNR}_{victim}$ in Equations 1, 2, 3, and 4. In this case, the BS may calculate them using the BER or BLER performance graph. Further, the UE has an advantage in that the BER or BLER performance graph is not used.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method for selecting an HD or FD mode in a wireless communication system supporting an FDR scheme and apparatus therefor can be industrially applied to various wireless communication systems including the 3GPP LTE/LTE-A system.

What is claimed is:

1. A method for selecting either a half duplex (HD) mode or a full duplex (FD) mode by a base station (BS) in a wireless communication system supporting a full duplex radio (FDR) scheme, the method comprising:
   receiving, from a second user equipment (UE) which suffers interference from a first UE, a value related to a signal-to-noise ratio (SNR) of the second UE and a value related to a signal-to-interference-plus-noise ratio (SINR) of the second UE;
   measuring SNR and SINR values of the BS;
   calculating a channel capacity ratio between the HD mode and FD mode using the value related to SNR of the second UE, the value related to SINR of the second UE, the measured SNR value of the BS, and the measured SINR value of the BS, wherein the channel capacity ratio between the HD and FD modes is obtained based on an equation including $$\frac{\log\{(1+SINR_{eNB})^2(1+SINR_{victim})^2\}}{\log\{(1+SNR_{eNB})(1+SNR_{victim})\}},$$

wherein $SNR_{victim}$ is the SNR of the second UE and $SINR_{victim}$ is the SINR of the second UE; and selecting either the HD or FD mode based on the calculated channel capacity ratio, wherein when the calculated channel capacity ratio is compared with a specific threshold value and the ratio is lower than the specific threshold value, the HD mode is selected, and otherwise, the FD mode is selected.

2. The method of claim 1, further comprising transmitting information on the selected mode to the first UE and the second UE.

3. The method of claim 1, wherein the value related to SNR of the second UE includes receive power and a thermal noise value of the second UE for a specific signal in a corresponding channel bandwidth.

4. The method of claim 1, wherein the value related to SINR of the second UE includes receive power and a thermal noise value of the second UE for a specific signal in a corresponding channel bandwidth and inter-UE interference power caused by the first UE.

5. The method of claim 1, wherein the specific threshold value is 1.

6. A base station (BS) for selecting either a half duplex (HD) mode or a full duplex (FD) mode in a wireless communication system supporting a full duplex radio (FDR) scheme, the BS comprising:

a receiver configured to receive, from a second user equipment (UE) which suffers interference from a first UE, a value related to a signal-to-noise ratio (SNR) of the second UE and a value related to a signal-to-interference-plus-noise ratio (SINR) of the second UE; and a processor configured to:

measure SNR and SINR values of the BS;

calculate a channel capacity ratio between the HD mode and FD mode using the value related to SNR of the second UE, the value related to SINR value of the second UE, the measured SNR value of the BS, and the measured SINR value of the BS, wherein the channel capacity ratio between the HD and FD modes is obtained based on an equation including $$\frac{\log\{(1+SINR_{eNB})^2(1+SINR_{victim})^2\}}{\log\{(1+SNR_{eNB})(1+SNR_{victim})\}},$$

wherein $SNR_{victim}$ is the SNR of the second UE and $SINR_{victim}$ is the SINR of the second UE; and select either the HD or FD mode based on the calculated channel capacity ratio, wherein when the calculated channel capacity ratio is compared with a specific threshold value and the ratio is lower than the specific threshold value, the HD mode is selected, and otherwise, the FD mode is selected.

7. The BS of claim 6, further comprising a transmitter configured to transmit information on the selected mode to the first UE and the second UE.

8. The BS of claim 6, wherein the value related to SNR of the second UE includes receive power and a thermal noise value of the second UE for a specific signal in a corresponding channel bandwidth.

9. The BS of claim 6, wherein the value related to SINR of the second UE includes receive power and a thermal noise value of the second UE for a specific signal in a corresponding channel bandwidth and inter-UE interference power caused by the first UE.

10. The BS of claim 6, wherein the specific threshold value is 1.

11. A method for selecting either a half duplex (HD) mode or a full duplex (FD) mode by a first user equipment (UE) suffering interference from a neighboring UE in a wireless communication system supporting a full duplex radio (FDR) scheme, the method comprising:

measuring signal-to-noise ratio (SNR) and signal-to-interference-plus-noise ratio (SINR) values of the first UE;

calculating a value related to a channel capacity ratio between the HD mode and FD mode using a value related to SNR of the first UE, and a value related to SINR of the first UE, wherein the value related to the channel capacity ratio between the HD and FD modes is obtained based on an equation including $(1+SINR_{victim})^2/(1+SNR_{victim})$, wherein $SINR_{victim}$ is the SINR of the first UE and $SNR_{victim}$ is the SNR of the first UE; and selecting either the HD or FD mode based on the value related to the channel capacity ratio is compared with a specific threshold value and the ratio is lower than the specific threshold value, the HD mode is selected, and otherwise, the FD mode is selected.

12. The method of claim 11, further comprising transmitting information indicating the selected mode to a base station (BS).

13. The method of claim 11, wherein the specific threshold value is 1.

14. A first user equipment (UE) for selecting either a half duplex (HD) mode or a full duplex (FD) mode in a wireless communication system supporting a full duplex radio (FDR) scheme, wherein the first UE suffers interference from a neighboring UE, the first UE comprising:

a processor configured to:

measure signal-to-noise ratio (SNR) and signal-to-interference-plus-noise ratio (SINR) values of the first UE;

calculate a value related to a channel capacity ratio between the HD mode and FD mode using a value related to SNR of the first UE, and a value related to SINR of the first UE, wherein the value related to the channel capacity ratio between the HD and FD modes is obtained based on an equation including $(1+SINR_{victim})^2/(1+SNR_{victim})$, wherein $SINR_{victim}$ is the SINR of the first UE and $SNR_{victim}$ is the SNR of the first UE; and select either the HD or FD mode based on the value related to the channel capacity ratio is compared with a specific threshold value and the ratio is lower than the specific threshold value, the HD mode is selected, and otherwise, the FD mode is selected.

15. The first UE of claim 14, further comprising a transmitter configure to transmit information indicating the selected mode to a base station (BS).

16. The first UE of claim 14, wherein the specific threshold value is 1.

* * * * *